Jan. 12, 1954     R. R. MEYER ET AL     2,665,568
METHOD OF AND APPARATUS FOR COOLING AND DRYING RUBBER
Filed Oct. 7, 1949                          4 Sheets-Sheet 1

INVENTORS.
Robert R. Meyer.
Harold E. Lietaert.
BY
Harness, Dickey & Pierce
ATTORNEYS.

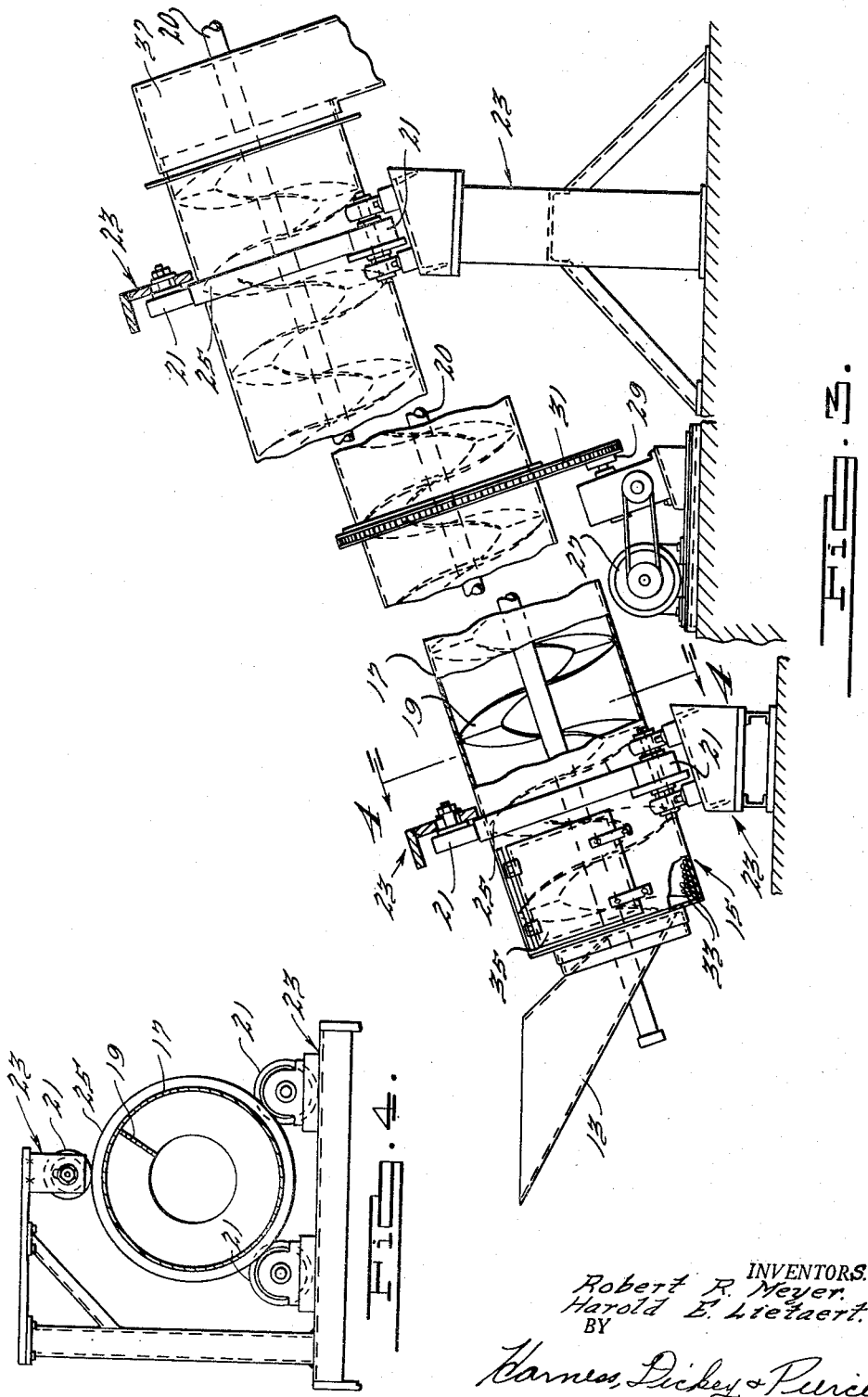

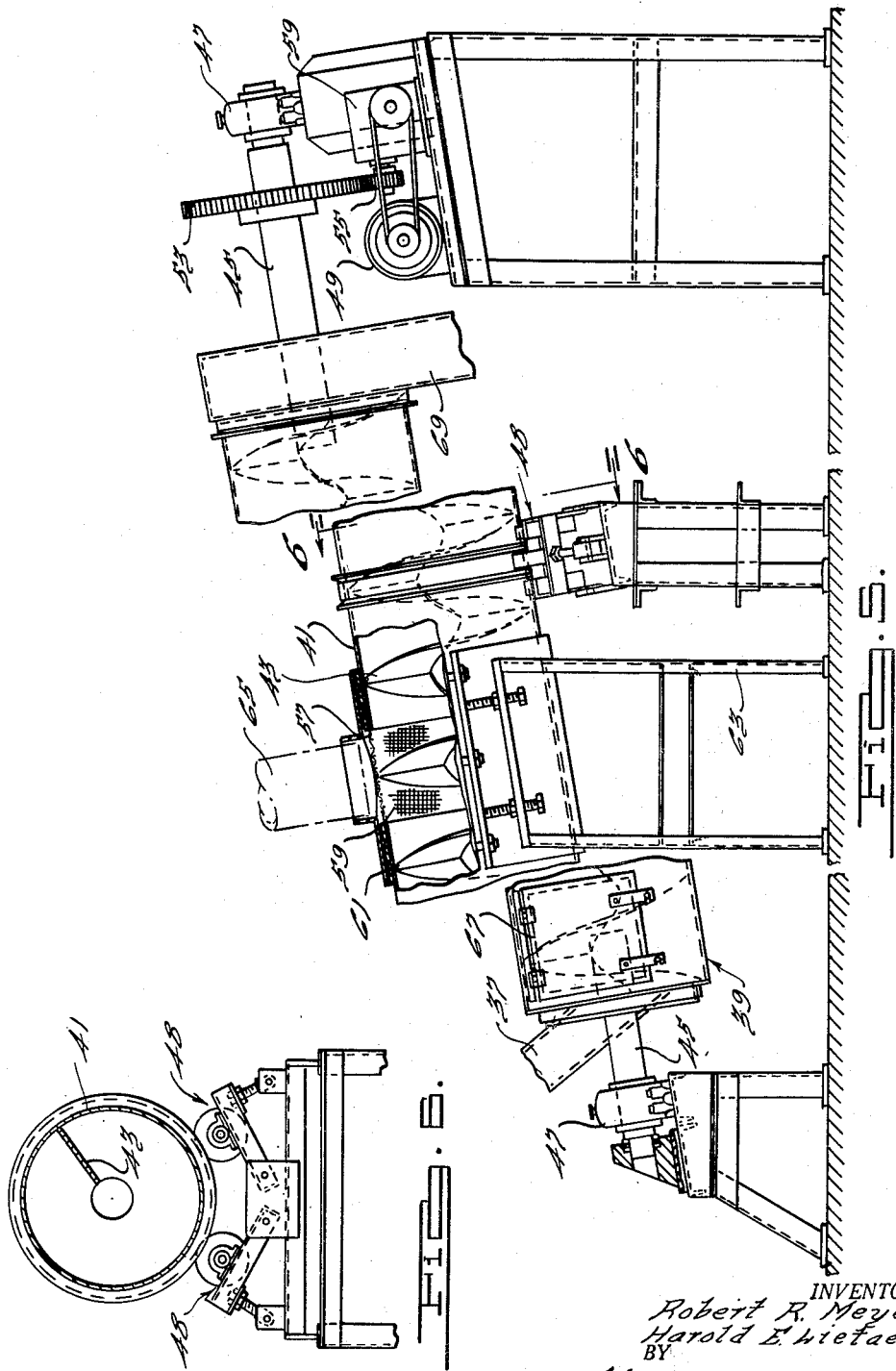

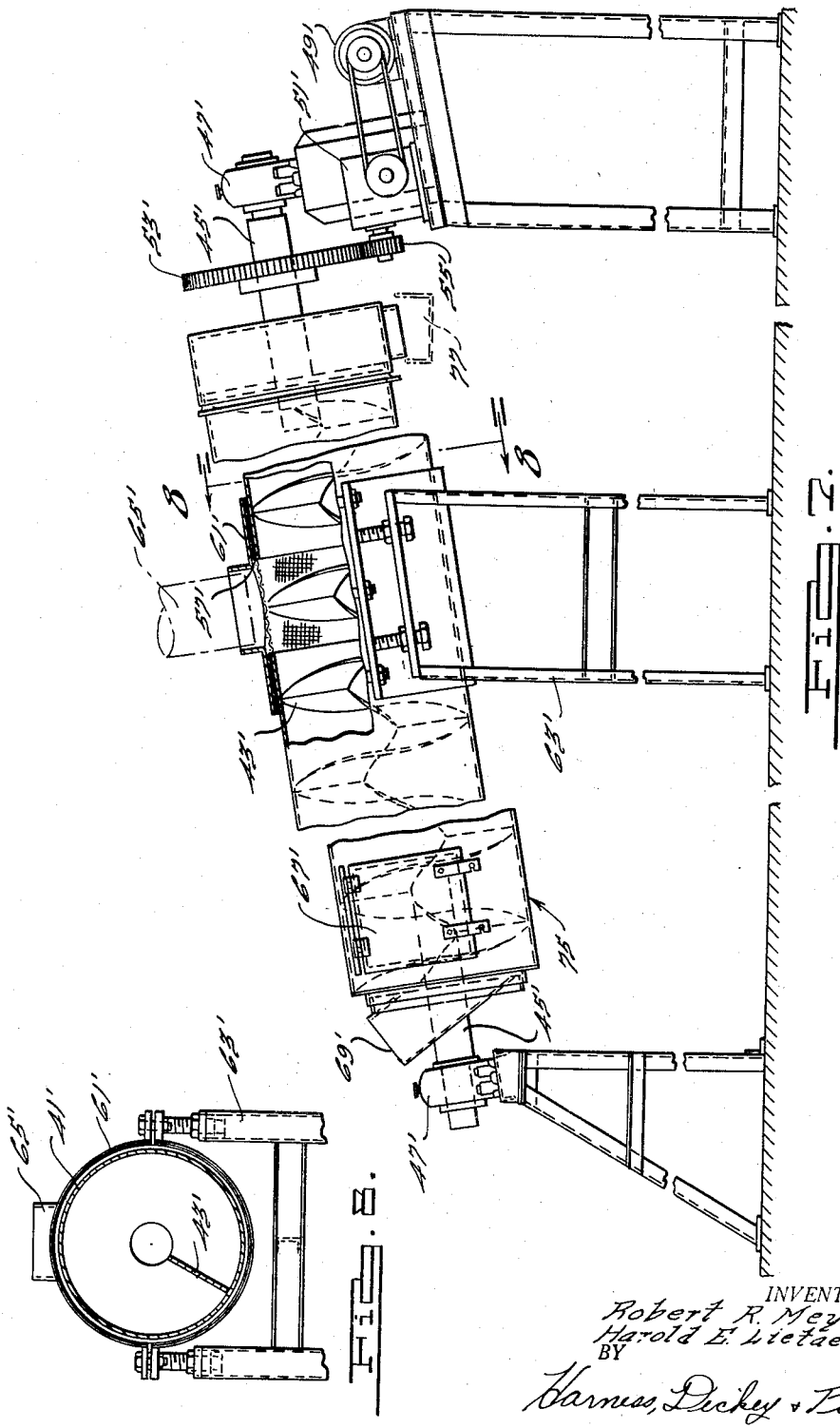

Patented Jan. 12, 1954

2,665,568

UNITED STATES PATENT OFFICE 2,665,568

METHOD OF AND APPARATUS FOR COOLING AND DRYING RUBBER

Robert R. Meyer and Harold E. Lietaert, Monroe, Mich., assignors to Monroe Auto Equipment Company, Monroe, Mich., a corporation Application October 7, 1949, Serial No. 120,192

3 Claims. (Cl. 62—178)

This invention relates to a method of and apparatus for cooling and drying hot wetted articles of the type which tend to adhere together when relatively hot, and more particularly to a method of and apparatus for cooling and drying hot wetted rubber pellets.

In the manufacture of rubber articles it is generally necessary to add certain ingredients to the raw rubber so as to obtain the desired rubber compound. In order to accomplish this raw rubber is generally fed into a mixing machine such as the type commercially known as a "Banbury" machine, wherein additional compounds are added to the raw rubber and the entire rubber compound is thoroughly mixed together. The rubber compound which emerges from the mixing machine is, of course, extremely hot. In the manufacture of certain types of rubber articles it is desirable to have the rubber compound in the form of pellets. If this is the case, the rubber is fed from the mixing machine through a suitable device for cutting the rubber up into small pellets. As the rubber pellets are extremely hot and tend to adhere together, it is necessary to cool and dry the same before the pellets can be stored or packed for later use. In the past, many ways of cooling and drying the rubber pellets have been attempted, but none have proven entirely satisfactory. One such method has been to immerse the hot pellets in a liquid solution, so as to partially cool the same, and then feed the wetted pellets onto a belt-type conveyor. The belt-type conveyor may be stepped so that the pellets drop from one level to another as they are conveyed. With this process it has taken an extremely long period of time, a large amount of space, and a large amount of expensive conveyor machinery to dry and cool the rubbert pellets. In addition to the foregoing, this method has not been satisfactory, due to the fact that the pellets, after they are cooled and dried, have generally not been completely covered with a powder film, which remains thereon after the liquid has been removed. The powder aids in preventing any adhering of the pellets, even after they are cool and dry, and it is, therefore, desirable to have the entire surface of each pellet completely covered with the same.

With the method and apparatus of this invention, hot wetted articles are simultaneously tumbled and conveyed in air at room temperature, so that excess liquid is removed therefrom and so that the articles are partially cooled. After the pellets are partially dried and cooled, the tumbling is continued and air is circulated by means of a blower, over and around the articles, so that the remaining liquid thereon will be evaporized and the pellets will be cooled through the process of evaporation to a temperature below that at which they will readily adhere together.

It is, therefore, an object of this invention to provide a novel method of cooling and drying hot articles, which is economical, efficient, simple and more satisfactory than any heretofore known.

It is a still further object of this invention to provide novel, improved apparatus for carrying out the above method, which is relatively inexpensive to manufacture and maintain, and which simultaneously with the cooling and drying, automatically conveys the articles along a desired path of travel.

It is a still further object of this invention to provide a method of and apparatus for cooling and drying hot wetted articles of the type which tend to adhere together when heated, in a minimum length of time, minimum space, and at a minimum expense.

These and other objects of this invention will become apparent from the following detailed description, taken in conjunction with the accompanying drawings, in which:

Fig. 3 is a side view, partially in section and partially in elevation, of the first operating section of the apparatus illustrated in Figs. 1 and 2;

Fig. 4 is a sectional view of the structure illustrated in Fig. 3, taken along the line 4—4 thereof;

Fig. 5 is a fragmentary side view, partially in section and partially in elevation, of the second operating section of the apparatus illustrated in Figs. 1 and 2;

Fig. 6 is a sectional view of the structure illustrated in Fig. 5, taken along the line 6—6 thereof;

Fig. 7 is a side view, partially in section and partially in elevation, of a third operating section of the apparatus illustrated in Figs. 1 and 2; and Fig. 8 is a sectional view of the structure illustrated in Fig. 7, taken along the line 8—8 thereof.

Figure 1:
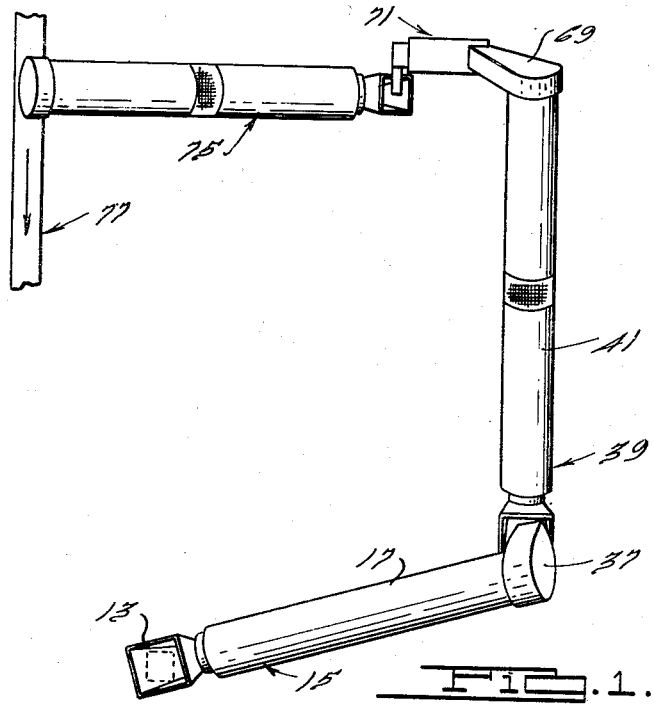
Figure 1 is a schematic plan view of the apparatus of this invention.

Referring now to the drawings, heated rubber compound which is discharged from the rubber mixing machine, such as a "Banbury" mixer, is fed into a pelletizer device 11, which cuts the rubber into small pellets by means of rotating knives in a drum. Preferably, a liquid solution is sprayed into the drum so as to partially cool the pellets and prevent the rubber from adhering to the knives. However, the pellets may be partially cooled in a separate bath or spray, after being discharged from the device 11, as will hereinafter appear. The liquid solution may be water having some suitable powder mixed therewith, so that when the water is evaporated the pellets will be coated with powder to aid in the prevention of pellet adherence. The rubber coming from the "Banbury" mixer and pelletizer is, due to the mixing action, at a temperature of around 315° F., and after being subjected to the liquid solution the temperature of the rubber pellets drops to around 235° F. The hot wetted pellets are discharged from the pelletizer 11 into a hopper 13 connected with the entrance end of a tumbling and conveying device 15.

The device 15 includes a cylindrical drum 17 having a continuous, axially extending screw 19, formed of a plurality of sheet elements, welded to the inner periphery thereof, for feeding pellets from the entrance end to the exit end of the drum. A pipe 20, may extend axially through the center of drum 17, and have suitable spray heads associated therewith, for spraying liquid solution on the pellets, after they are fed into the drum. Generally, if the pellets have been previously sprayed, as set forth above, it will not be necessary to spray them in the drum, but if they have not been previously sprayed, the spraying may be done in the drum, through pipe 20.

The drum 17 is rotatably supported on a supporting surface, such as a floor or the like, by means of roller-like elements 21, rotatably supported on supporting stands or brackets 23. The rollers 21 engage annular ring-like members 25 on the outer periphery of the drum, adjacent each end thereof. The drum is supported in an inclined position, so that the entrance end thereof is lower than the exit end, and the drum is rotatably driven by a motor 27 through gearing 29, and chain 31, which is connected with the gearing and with the outer periphery of the drum 17. The peripheral wall of the drum 17, adjacent the entrance end thereof, is perforated at 33 to permit water to drain from the drum, as will hereinafter appear. The drum is also provided with an emergency door 35, to permit entrance into the drum for cleaning or repair purposes.

The rubber pellets which are fed into the hopper 13 fall by gravity into the entrance end of the drum 17. As the drum is being rotated by the motor 27, the pellets will be tumbled and will be conveyed axially through the drum by the screw 19. Excess liquid will be removed from the rubber pellets by the tumbling operation and will drain from the drum through the perforations 33. The drum 17 rotates at a suitable speed, such as 18 to 20 R. P. M. to properly tumble the pellets as they move axially through the drum, thereby causing the pellets to be partially dried and partially cooled. In most cases the pellets are tumbled in air at substantially room temperature, although of course, under extreme weather conditions this may be varied. When the pellets reach the exit end of the drum 17, they fall therefrom through a chute or hood 37 into the entrance end of a second tumbling and conveying device 39, which includes a drum 41, having a screw 43 therein, in the same manner as the drum 17. Shafts 45 are connected with and project from the opposite ends of the drum and are rotatably supported in a suitable bearing supporting structure 47. A supporting roller structure 48 is provided, intermediate the ends of the drum, for rotatably supporting the central portion thereof. The drum is rotatably driven by a motor 49, through a gear box 51 and gears 53 and 55, the former of which is mounted on one of the shafts 45.

Figure 2:
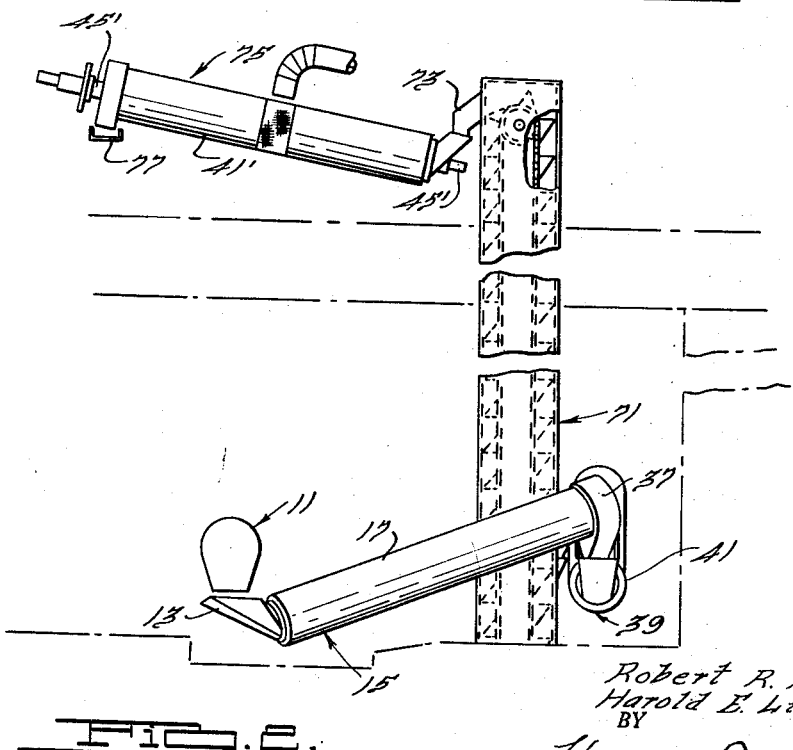
Fig. 2 is a schematic side view of the apparatus of this invention.

The peripheral wall of the drum 41, intermediate the ends thereof, is cut out at 57 and covered with a screen 59. Surrounding the screen 59 is a stationary blower bonnet 61, which in turn is supported by a supporting structure 63. Conduit 65 is connected with the blower bonnet 61 and a suitable blower (not shown) is provided for blowing air into the interior of the drum 41 through the screen 59. The drum 41, adjacent the entrance end thereof, is provided with an emergency door 67, for the same purpose as the door 35 of drum 17. If desired, additional powder may be sprinkled onto the rubber pellets which are discharged from the exit end of the drum 17 and fall through the chute 37 into the entrance end of the drum 41. The pellets in drum 41 are tumbled in the same manner as in the drum 17 and are axially conveyed to the exit end of the drum 41. The air blown into the drum 41 through conduit 65 and screen 59 circulates through the drum 41 in both directions and a certain portion of the blown air passes up through hood 37 and into the exit end of the drum 17. The pellets are dried and cooled as they pass through the drum 41, in a manner which will be hereinafter described. The drum 41 is inclined in the same manner as the drum 17, and the drum 41 is shown as extending angularly with respect to the drum 17, although it will be appreciated that the relative positions of the drums 17 and 41 may be varied, but are illustrated as being disposed at angles with respect to each other, in order to eliminate the necessity of an exceptionally long room in which the device of this invention is mounted. The pellets are discharged from the drum 41 through a chute 69 and into any suitable type of conveyor, such as the vertical bucket conveyor 71 illustrated in Figs. 1 and 2. The pellets are carried up the bucket conveyor 71, and are discharged therefrom through a chute 73 into the entrance end of a device 75, similar to the device 39 previously described. The device 75 is illustrated in the drawings as being disposed on a different floor of a building than the devices 15 and 39, but the position of the device 75 relative to the devices 15 and 39 may be varied and is illustrated only in connection with the layout of one particular manufacturing plant.

The device 75 which is illustrated in detail in Figs. 7 and 8, is substantially identical with the device 39 and similar parts are given primed numbers corresponding to the numbers of the device 39. The pellets are tumbled and conveyed axially through the device 75 and are discharged therefrom into any suitable containers or onto a belt-like conveyor 77, which will transport them to storage bins, or the like.

When the pellets are discharged into the device 15, they are extremely hot and very wet. As they are tumbled and conveyed through the device 15, the excess liquid is removed therefrom, so that when the pellets reach the exit end of the drum 17 they are still covered with a film of liquid. Also, as the pellets move through the drum 17, they are partially cooled, so that as they are discharged from the drum their temperature will have dropped to around 125°. The partially dried and partially cooled pellets which enter the second device 39, are immediately subjected to the flow of air from the blower through the drum 41. As the pellets move through the drum 41, and the air is circulated thereover, the remaining liquid will be evaporated from the pellets and during the evaporation the remaining excess heat will be removed from the pellets to cool the same down to a temperature where they will not readily adhere. It is desirable that the pellets not be completely cooled in the device 15, for if they were it would be difficult to completely dry the same in the length of the drum 41. Furthermore, it can be appreciated that the pellets cannot be dried by extremely hot air, as they would not be cooled when they reach the end of the drum 41. It has, therefore, been found that the best results are achieved when the pellets are only partially dried and partially cooled in the drum 17, so that the remaining liquid can be evaporated in the drum 41, which in turn will cause the pellets to be cooled down to a temperature below 110° so that they will not readily adhere together.

It will furthermore be appreciated that the tumbling action to which the pellets are subjected in the drums 17 and 41 will prevent the pellets from sticking together or adhering, will subject the entire surface of each pellet to the sair so that the same will dry and cool in a more efficient manner than would be possible on any belt-type of conveyor, and will enable the pellets to be uniformly coated with powder so that there will be no tendency for them to adhere, even after they are sufficiently cool. That is, the pellets are subjected to a rolling action and as they roll, drop from the top of the drums to the bottom, and are axially conveyed, more uniform cooling is obtained, as well as more uniform coverage by the non-adhering agents or powder than has been heretofore possible. The device 75 which is illustrated as being on a different floor in the building from the devices 15 and 39, is provided only as a safety measure, to positively insure that the pellets will be completely dried and cooled before they are stored, but it has been found that in most cases the pellets will be satisfactorily dried and cooled after they leave the exit end of the drum 41. In most cases the air which is blown into the drum 41 of the device 39, and drum 41' of the device 75, will be at room temperature, but in the event of extremely high humidity the air may be heated slightly in order to more efficiently dry and cool the pellets.

It will, of course, be appreciated that the lengths, relative positions and speeds of rotation of the drums of the devices 15, 39 and 75, may be varied in accordance with the space which is available in a manufacturing plant and in accordance with other factors which may vary from one manufacturer to another. In any event, however, the method and apparatus of this invention will more satisfactorily, efficiently and inexpensively cool and dry rubber pellets or other suitable products, such as plastics or the like, in the shortest period of time, in the smallest space, and with the least expensive equipment to manufacture and maintain. The method of removing the excess liquid from the pellets and partially cooling the same in the first operating section of the apparatus, and completely drying and cooling the pellets through an evaporization process in the second, or second and third, operating sections of the apparatus, permits results to be achieved which have not been possible heretofore.

What is claimed is:

1. The method of cooling and drying hot wetted articles which tend to adhere when relatively hot, including the steps of removing the excess liquid by simultaneously rotatably tumbling said articles in air and conveying said articles along a desired path of travel, removing the excess liquid from contact with the articles, the length of time of said tumbling being such that said articles will only be partially dried and partially cooled after said tumbling and conveying operation, of continuing the tumbling and conveying of said articles after the excess liquid is removed, and of circulating gas cooler than the articles over and around said articles during said latter tumbling and conveying operation, to evaporate liquid from said articles and thereby simultaneously cool and dry the same so that they will not tend to readily adhere.

2. The method of cooling and drying relatively hot articles of the type which tend to adhere together when hot, including the steps of partially cooling the articles with a liquid solution, of removing excess liquid by simultaneously rotatably tumbling said articles to partially cool the same and conveying the articles along a desired path of travel, removing the excess liquid from contact with the articles, of continuing the tumbling of said articles in said partially dry and cool state, and of circulating gas cooler than the articles over and around said articles during said latter tumbling operation, so that the remaining liquid on said articles will be evaporated therefrom and will cool said articles to a temperature below that at which they will tend to readily adhere.

3. The method of handling, cooling and drying hot articles of the type that tend to adhere together when hot, including the steps of partially cooling the articles in a liquid solution so as to coat said articles with at least a film of liquid, of removing excess liquid by simultaneously rotatably tumbling said articles to partially cool the same, and conveying the articles along a desired path of travel, removing the excess liquid from contact with the articles, and of circulating gas cooler than the articles over and around the said articles during said tumbling and conveying operation and after the excess liquid has been removed from said articles and said articles are partially cool so as to evaporate the remaining liquid from the articles and simultaneously cool and dry the same to a point where they will not tend to readily adhere together.

ROBERT R. MEYER.
HAROLD E. LIETAERT.

References Cited in the file of this patent

UNITED STATES PATENTS

| Number | Name | Date |
|---|---|---|
| 181,776 | Davis | Sept. 5, 1876 |
| 187,148 | Junker et al. | Feb. 6, 1877 |
| 474,305 | Sanderson | May 3, 1892 |
| 1,758,910 | Goodwin | May 13, 1930 |
| 1,844,782 | Mittag | Feb. 9, 1932 |
| 1,880,273 | Pardee et al. | Oct. 4, 1932 |
| 2,074,881 | Witting | Mar. 23, 1937 |
| 2,095,086 | Slemmer | Oct. 5, 1937 |
| 2,136,870 | Vissac | Nov. 15, 1938 |
| 2,174,896 | Sackett | Oct. 3, 1939 |
| 2,178,750 | Garland | Nov. 7, 1939 |
| 2,188,798 | Smith | Jan. 30, 1940 |
| 2,237,134 | Curran | Apr. 1, 1941 |
| 2,264,610 | Beardsley | Dec. 2, 1941 |
| 2,264,646 | Spears | Dec. 2, 1941 |
| 2,286,405 | Gordon | June 16, 1942 |
| 2,305,078 | Harford | Dec. 15, 1942 |
| 2,323,289 | Anderson et al. | July 6, 1943 |
| 2,346,500 | Moore | Apr. 11, 1944 |
| 2,365,352 | Moffit | Dec. 19, 1944 |
| 2,563,084 | Turnball | Aug. 7, 1951 |